(12) United States Patent
Zhou et al.

(10) Patent No.: US 12,328,272 B2
(45) Date of Patent: Jun. 10, 2025

(54) COMMUNICATION METHOD AND APPARATUS

(71) Applicant: Shenzhen Yinwang Intelligent Technologies Co., Ltd., Shenzhen (CN)

(72) Inventors: Zheng Zhou, Beijing (CN); Sha Ma, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 428 days.

(21) Appl. No.: 17/576,618

(22) Filed: Jan. 14, 2022

(65) Prior Publication Data
US 2022/0140963 A1  May 5, 2022

Related U.S. Application Data

(63) Continuation of application No. PCT/CN2020/101660, filed on Jul. 13, 2020.

(30) Foreign Application Priority Data

Jul. 16, 2019 (CN) ......................... 201910639922.X (51) Int. Cl.
*H04L 5/00* (2006.01)
*B60R 16/023* (2006.01)

(52) U.S. Cl.
CPC ........ *H04L 5/0037* (2013.01); *B60R 16/0231* (2013.01); *H04L 5/0055* (2013.01)

(58) Field of Classification Search
CPC ..... H04L 5/0037; H04L 5/0055; H04L 67/12; H04L 67/62; B60R 16/0231; H04W 4/38
See application file for complete search history.

(56) References Cited

U.S. PATENT DOCUMENTS 9,439,027 B2   9/2016  Yokota et al.
10,306,430 B1  5/2019  Abari et al.
10,812,125 B1* 10/2020  Badic .................. H04W 72/542
(Continued)

FOREIGN PATENT DOCUMENTS

CN    104118429 A   10/2014
CN    104605939 A    5/2015
(Continued)

OTHER PUBLICATIONS

"Road vehicles—Data communication between sensors and data fusion unit for automated driving functions—Logical interface," ISO/WD 23150:2019(E), ISO/TC 22/SC 31/WG 9; total 176 pages (2019).

*Primary Examiner* — Steven Hieu D Nguyen
(74) *Attorney, Agent, or Firm* — Leydig, Voit & Mayer, Ltd.

(57) ABSTRACT

A communication method and an apparatus are provided, to improve transmission resource utilization. The communication method and the apparatus relate to the field of automatic driving or smart driving technologies. The method includes: obtaining first data and second data; and sending the first data to a second apparatus based on a first period, and sending the second data to the second apparatus based on a second period, where the first period is a sending period of the first data, the second period is a sending period of the second data, and the first period and the second period are different.

10 Claims, 6 Drawing Sheets

(56) References Cited

U.S. PATENT DOCUMENTS

| | | | |
|---|---|---|---|
| 2013/0102251 A1* | 4/2013 | Linde | H04L 1/1887 |
| | | | 455/41.2 |
| 2016/0112216 A1 | 4/2016 | Sargent et al. | |
| 2016/0165220 A1 | 6/2016 | Fujimaki et al. | |
| 2017/0019220 A1* | 1/2017 | Yonge, III | H04L 5/003 |
| 2017/0238250 A1* | 8/2017 | Guo | H04W 4/80 |
| | | | 370/311 |
| 2017/0238260 A1* | 8/2017 | Kim | H04L 1/1819 |
| | | | 455/522 |
| 2018/0088584 A1 | 3/2018 | Tascione et al. | |
| 2018/0139350 A1* | 5/2018 | Yan | H04N 1/00891 |
| 2018/0237039 A1 | 8/2018 | Mong et al. | |
| 2018/0368068 A1 | 12/2018 | Deorah et al. | |
| 2021/0044346 A1* | 2/2021 | Murakami | H04W 4/06 |
| 2021/0368139 A1* | 11/2021 | Ishida | G08B 21/0476 |

FOREIGN PATENT DOCUMENTS

| | | |
|---|---|---|
| CN | 105610662 A | 5/2016 |
| CN | 106114491 A | 11/2016 |
| CN | 107819799 A | 3/2018 |
| CN | 108156186 A | 6/2018 |
| CN | 108712733 A | 10/2018 |
| CN | 109204307 A | 1/2019 |
| EP | 3691300 A1 | 8/2020 |
| WO | 2018134941 A1 | 7/2018 |
| WO | 2019066108 A1 | 4/2019 |

\* cited by examiner

COMMUNICATION METHOD AND APPARATUS

CROSS-REFERENCE TO RELATED APPLICATIONS

This application is a continuation of International Application No. PCT/CN2020/101660, filed on Jul. 13, 2020, which claims priority to Chinese Patent Application No. 201910639922.X, filed on Jul. 16, 2019. The disclosures of the aforementioned applications are hereby incorporated by reference in their entireties.

TECHNICAL FIELD

Embodiments of this application relate to the field of automatic driving technologies, and in particular, to a communication method and an apparatus.

BACKGROUND

As society develops, a smart automobile is gradually entering people's daily life. A sensor plays an important role in assisted driving and automatic driving of the smart automobile. Various sensors, such as millimeter-wave radar, lidar, a camera, and ultrasonic radar, installed on an automobile detect a surrounding environment at any time, collect data, identify and track a moving object, identify static scenarios such as a lane line and a sign, and plan a route based on a navigator and map data in a driving process of the automobile. The sensors can detect a potential danger in advance, help a driver in a timely manner, and even autonomously take a necessary avoidance measure, to effectively improve automobile driving security and comfort.

In the prior art, in an automatic driving advanced scenario, establishment of an environment model depends on data collected by different sensors. The data collected by the sensors is usually reported to a data fusion unit in a unified manner based on a single report period through a standard interface, so that the data fusion unit can complete the assisted driving based on the data.

However, change periods or update periods of the data collected by the sensors are usually different. When the data is reported in the unified manner based on the single report period, the sensors report a large amount of useless data collected in the single period. Consequently, a large amount of redundant information is caused. As a result, transmission resource utilization is low.

SUMMARY

Embodiments of this application provide a communication method and an apparatus, to improve transmission resource utilization.

According to a first aspect, an embodiment of this application provides a communication method, including:
obtaining first data and second data; and
sending the first data to a second apparatus based on a first period, and sending the second data to the second apparatus based on a second period, where
the first period is a sending period of the first data, the second period is a sending period of the second data, and the first period and the second period are different.

Based on the first aspect, in a possible design, the first period is preconfigured, or is determined based on a collection period of the first data; and/or the second period is preconfigured, or is determined based on a collection period of the second data.

In this possible design, the first data may be determined based on a measurement period of a sensor. The second data may be determined based on a change period of a data source. Therefore, the sending period of the first data and the sending period of the second data are different.

Based on the first aspect, in a possible design, the method further includes:
receiving indication information from the second apparatus, where the indication information is used to indicate configuration information of the first period and configuration information of the second period.

In this possible design, the second apparatus may be a fusion module receiving data reported by the sensor, or a data fusion module of a central processing unit.

Based on the first aspect, in a possible design, the indication information includes the configuration information of the first period and the configuration information of the second period; or
the indication information includes acknowledgment information, and the acknowledgment information is used to acknowledge use of the configuration information of the first period and the configuration information of the second period.

In this possible design, the second apparatus may first send the indication information. After receiving the indication information, a sensor side sends the configuration information of the first period and the configuration information of the second period to the second apparatus. Then, the second apparatus acknowledges the configuration information of the first period and the configuration information of the second period. If the sensor side receives the acknowledgment information fed back by the second apparatus, configuration of the first period and the configuration of the second period are completed.

Based on the first aspect, in a possible design, the method further includes:
sending period configuration information to the second apparatus, where the period configuration information includes the configuration information of the first period and/or the configuration information of the second period.

In this possible design, the sensor side may actively send the period configuration information to the second apparatus.

Based on the first aspect, in a possible design, the method further includes:
a duration of the second period is N times a duration of the first period, and N is a natural number greater than 1.

Based on the first aspect, in a possible design, the method further includes:
suspending sending the second data to the second apparatus in the second period.

In this possible design, the sensor side may determine, at any moment, whether to suspend sending the second data to the second apparatus in the second period. Optionally, the sensor side may determine whether to suspend sending of any reported data.

Based on the first aspect, in a possible design, a duration of the third period is N times the duration of the first period, and N is a natural number greater than 1.

According to a second aspect, an embodiment of this application provides a communication method, including:
receiving first data from a first apparatus, and receiving second data from the first apparatus, where a sending period of the first data is a first period, a sending period of the second data is a second period, and the first period and the second period are different.

Based on the second aspect, in a possible design, the method further includes:

sending indication information to the first apparatus, where the indication information is used to indicate configuration information of the first period and configuration information of the second period.

In this possible design, the first apparatus may be a sensor collecting various environmental data.

Based on the second aspect, in a possible design, the indication information includes the configuration information of the first period and the configuration information of the second period; or the indication information includes acknowledgment information, and the acknowledgment information is used to acknowledge use of the configuration information of the first period and the configuration information of the second period.

In this possible design, the first apparatus may receive the indication information from a second apparatus. The indication information is used to indicate the first apparatus to configure periods. The first apparatus sends the configuration information of the first period and the configuration information of the second period to the second apparatus. Then, the second apparatus feeds back the acknowledgment information to the first apparatus. In this way, a report period of each piece of data may be determined in an interaction manner.

Based on the second aspect, in a possible design, the method further includes:

receiving period configuration information sent by the first apparatus, where the period configuration information includes the configuration information of the first period and/or the configuration information of the second period.

Based on the second aspect, in a possible design, a duration of the second period is N times a duration of the first period, and N is a natural number greater than 1.

Based on the second aspect, in a possible design, the method further includes:

receiving third data from the first apparatus, where a sending period of the third data is a third period.

Based on the second aspect, in a possible design, a duration of the third period is N times the duration of the first period, and N is a natural number greater than 1.

According to a third aspect, an embodiment of this application provides a first apparatus for communication, including:

a processing module, configured to obtain first data and second data; and a sending module, configured to send the first data to a second apparatus based on a first period, and send the second data to the second apparatus based on a second period, where the first period is a sending period of the first data, the second period is a sending period of the second data, and the first period and the second period are different.

Based on the third aspect, in a possible design, the first period is preconfigured, or is determined based on a collection period of the first data; and/or the second period is preconfigured, or is determined based on a collection period of the second data.

Based on the third aspect, in a possible design, the apparatus further includes:

a receiving module, configured to receive indication information from the second apparatus, where the indication information is used to indicate configuration information of the first period and configuration information of the second period.

Based on the third aspect, in a possible design, the indication information includes the configuration information of the first period and the configuration information of the second period; or the indication information includes acknowledgment information, and the acknowledgment information is used to acknowledge use of the configuration information of the first period and the configuration information of the second period.

Based on the third aspect, in a possible design, the sending module is further configured to send period configuration information to the second apparatus, where the period configuration information includes the configuration information of the first period and/or the configuration information of the second period.

Based on the third aspect, in a possible design, a duration of the second period is N times a duration of the first period, and N is a natural number greater than 1.

Based on the third aspect, in a possible design, the processing module is further configured to suspend sending the second data to the second apparatus in the second period.

Based on the third aspect, in a possible design, the sending module is further configured to send third data to the second apparatus based on a third period.

Based on the third aspect, in a possible design, a duration of the third period is N times the duration of the first period, and N is a natural number greater than 1.

According to a fourth aspect, an embodiment of this application provides a second apparatus for communication, including:

a receiving module, configured to receive first data from a first apparatus, and receive second data from the first apparatus, where a sending period of the first data is a first period, a sending period of the second data is a second period, and the first period and the second period are different.

Based on the fourth aspect, in a possible design, the apparatus further includes:

a sending module, configured to send indication information to the first apparatus, where the indication information is used to indicate configuration information of the first period and configuration information of the second period.

Based on the fourth aspect, in a possible design, the indication information includes the configuration information of the first period and the configuration information of the second period; or the indication information includes acknowledgment information, and the acknowledgment information is used to acknowledge use of the configuration information of the first period and the configuration information of the second period.

Based on the fourth aspect, in a possible design, the receiving module is further configured to receive period configuration information sent by the first apparatus, where the period configuration information includes the configuration information of the first period and/or the configuration information of the second period.

Based on the fourth aspect, in a possible design, a duration of the second period is N times a duration of the first period, and N is a natural number greater than 1.

Based on the fourth aspect, in a possible design, the apparatus further includes: receiving third data that is sent by the first apparatus based on a third period. Based on the fourth aspect, in a possible design, a duration of the third period is N times the duration of the first period, and N is a natural number greater than 1.

According to a fifth aspect, an embodiment of this application provides a communications apparatus, including a processor and a transceiver. The processor and the transceiver are configured to perform the communication method according to any one of the embodiments of this application in the first aspect or the second aspect.

According to a sixth aspect, an embodiment of this application provides a chip, including a memory and a processor. The memory is configured to store a program instruction. The processor is configured to invoke the program instruction in the memory to perform the communication method according to any one of the embodiments of this application in the first aspect or the second aspect.

According to a seventh aspect, an embodiment of this application provides a readable storage medium. The readable storage medium stores a computer program. When the computer program is executed, the communication method according to any one of the embodiments of this application in the first aspect or the second aspect is implemented.

According to an eighth aspect, an embodiment of this application provides a program product. The program product includes a computer program. The computer program is stored in a readable storage medium. At least one processor of a communications apparatus may read the computer program from the readable storage medium. The at least one processor executes the computer program, so that the communications apparatus implements the communication method according to any one of the embodiments of this application in the first aspect or the second aspect.

In this application, the data measurement period and the change period of the data source are different. Therefore, the obtained first data and the obtained second data may be sent by using different sending periods, to reduce redundant information and improve the transmission resource utilization.

DESCRIPTION OF EMBODIMENTS

Figure 1:
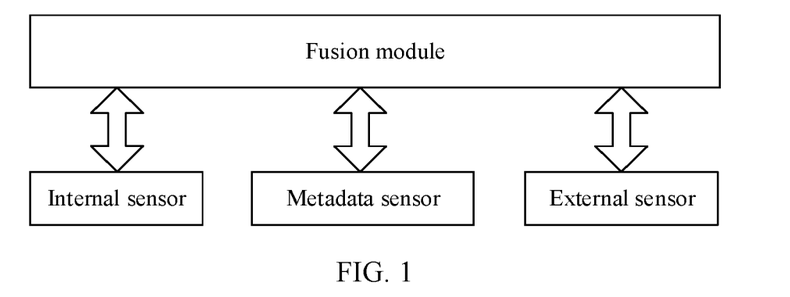
FIG. 1 is a schematic diagram of a communications system according to an embodiment of this application.

FIG. 1 is a schematic diagram of a communications system according to an embodiment of this application. As shown in FIG. 1, the communications system includes sensors and a fusion module.

Some terms in this application are explained in the following, to help a person skilled in the art have a better understanding.

The sensor: The sensor in this application indicates an in-vehicle sensor. There are many types of existing in-vehicle sensors, and each sensor has own interface format. Even for sensors of the same type, different vendors also have different interfaces. Therefore, a unified sensor interface is required to abstract data and obtain abstract data. The in-vehicle sensors can be usually classified into three types: an internal sensor, an external sensor, and a metadata sensor. As the name implies, the internal sensor indicates a sensor installed on or inside an automobile, and is usually used to measure a dynamic state of each component inside the automobile. For example, the internal sensor is a gyroscope, an accelerometer, a steering angle sensor, a wiper motion sensor, a steering indicator, or the like. The external sensor indicates a sensor that is installed on or inside an automobile and configured to measure a surrounding environment of the automobile or measure an internal environment of the automobile. For example, the external sensor is radar, a laser, an ultrasonic sensor, a camera, or the like. The metadata sensor usually indicates measurement of a data source. For example, the data source is cloud data, navigation map data, or the like.

The fusion module: The fusion module is configured to receive data uploaded by a sensor, and then perform fusion processing on the data, so that an in-vehicle system can construct a quasi-real environment model based on fused data. The fusion module may be integrated into a central processing unit, or may exist independently. Construction of the environment model depends on automobile location data, automobile dynamics data, object data in an environment, map grid data, lane data, and the like. When an automobile is automatic driving, a driving decision made by the in-vehicle system needs to depend on a constructed environment model.

Specifically, referring to FIG. 1, a plurality of sensors establish communication connections to the fusion module. In an optional implementation, the sensor packs measured data, and then sends a data packet to the fusion module based on a configured period. The data packet may include one type of data, or may include two or more types of data. When the two or more types of data are transmitted, report periods of the at least two types of data are different.

The following describes in detail the communication method in this application by using specific embodiments. It should be noted that the following several specific embodiments may be combined with each other, and same or similar content is not repeatedly described in different embodiments.

Figure 2:
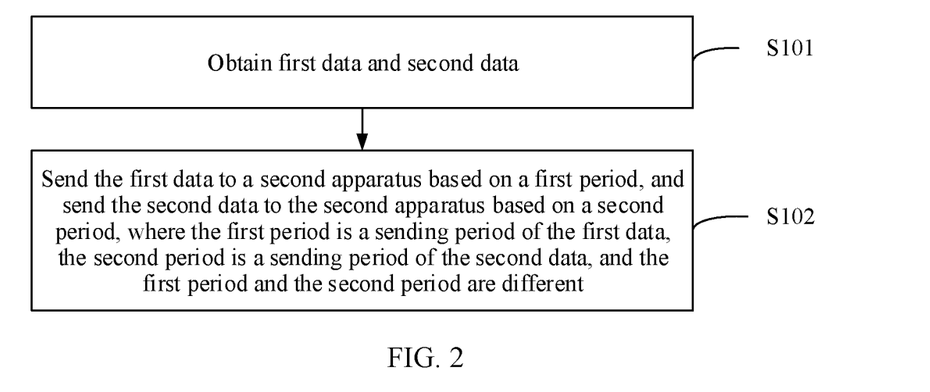
FIG. 2 is a flowchart 1 of a communication method according to an embodiment of this application.

FIG. 2 is a flowchart 1 of a communication method according to an embodiment of this application. Referring to FIG. 2, the method in this embodiment includes the following steps.

Step S101: Obtain first data and second data.

Step S102: Send the first data to a second apparatus based on a first period, and send the second data to the second apparatus based on a second period, where the first period is a sending period of the first data, the second period is a sending period of the second data, and the first period and the second period are different.

In this embodiment, a first apparatus may obtain the first data and the second data. Then, the first apparatus sends the first data to the second apparatus based on the first period, and sends the second data to the second apparatus based on the second period. The first period and the second period are different.

For example, the first apparatus may be a sensor, for example, radar, lidar, ultrasonic radar, or a camera. Specifically, the radar, the lidar, and the ultrasonic radar each measure a surrounding object from different dimensions. Conditions and attributes, of a target, sensed by each sensor are different. For example, the radar is good at identifying a target moving distance, a speed, and can be used in relatively wide weather conditions. However, the camera may identify surrounding environment information by collecting an image, and is greatly affected by a light condition.

It should be noted that a specific type of the first apparatus is not limited in this embodiment. The first apparatus may be a single sensor, may be a plurality of sensors of different types, or may be a combination device of a plurality of sensors of a same type.

For example, the first apparatus may be a first camera installed on a front end of an automobile. The first camera is configured to collect a moving object, a road traffic sign, traffic light information, and the like on a road.

For example, the first apparatus may be a combination device including a plurality of cameras. For example, the first apparatus may be a combination device including a first camera installed on a front end of an automobile, a second camera installed on a left side of the automobile, a third camera installed on a right side of the automobile, and a fourth camera installed on a rear end of the automobile. In this embodiment, the first camera, the second camera, the third camera, and the fourth camera are configured to photograph an environmental image of 360 degrees around the automobile.

For example, the first apparatus may be a combination device including radar, lidar, and ultrasonic radar. The radar, the lidar, and the ultrasonic radar may all be configured to measure a distance between the first apparatus and a surrounding object.

Further, it is known that a measurement period or a change period of the first data is the first period. A measurement period or a change period of the second data is the second period. The first period and the second period are different. In this case, if a minimum common divisor of the first period and the second period is used as a unified period for reporting data to the second apparatus, a large amount of redundant data exists.

Specifically, a camera installed on an automobile is used as an example for detailed description. It is assumed that the first data collected by the camera is information about a moving object on a road, and the second data collected by the camera is traffic light information. However, a period of obtaining the moving object on the road is very short. For example, an image including the moving object needs to be collected every tens of milliseconds. However, a change period of traffic lights is relatively slow. For example, the change period of the traffic lights at a common intersection is more than 30 seconds. In addition, the traffic lights most use an LED technology. The traffic lights are not always on, but blink. If a measurement period is short, for example, the traffic lights are in a blink off state, information may be incorrectly reported. Therefore, when the measurement period of the traffic lights is set, a relatively longer report period is set based on an actual application scenario, to reduce a false information report probability and reduce useless information report. On the contrary, if the information about the moving object and the traffic light information are reported based on the unified report period, a large amount of redundant traffic light information is caused. Consequently, this occupies a data transmission bandwidth and causes low data transmission resource utilization. According to the method in the embodiment shown in FIG. 2, different report periods may be separately configured for the information about the moving object and the traffic light information, to improve transmission resource utilization.

In the step S102, the first period may be preconfigured, or is determined based on a collection period of the first data.

For example, the first period may be configured based on a collection period of collecting the first data by the sensor, or may be configured based on a change period of the first data. A period of collecting the first data by the first apparatus may be preconfigured during installation or before delivery. If the first apparatus does not preconfigure the first period, the first period corresponding to the first data may be customized based on the collection period of the first data in the actual application scenario. For example, if the collection period of the first data is 2 seconds, the first period may be set to 2 seconds.

In the step S102, the second period may be preconfigured, or is determined based on a collection period of the second data.

Likewise, the second period may be configured based on a collection period of collecting the second data by the first apparatus, or may be configured based on a change period of the second data. A period of collecting the second data by the first apparatus may be preconfigured during installation or before delivery. If the first apparatus does not preconfigure the second period, the second period corresponding to the second data may be customized based on the collection period of the second data in the actual application scenario. For example, if the change period of the second data is 60 seconds, the second period may be set to 60 seconds.

For example, in a possible implementation, a duration of the second period may be set to N times a duration of the first period, where N is a natural number greater than 1.

Specifically, it is assumed that the first period is 20 seconds. In this case, the second period may be set to 40 seconds. In this case, a data packet including the first data and the second data is sent to the second apparatus at a time node of 40 seconds and a time node of a multiple thereof. A data packet including the first data and not including the second data is sent to the second apparatus at a time node of 20*(2k+1) seconds, where k is a natural number.

It should be noted that a quantity of types of data obtained by the first apparatus is not limited in this embodiment. The first apparatus may obtain more than two types of data. Specifically, three types of data are used as an example. It is assumed that a sending period of first data is a first period, a sending period of second data is a second period, and a sending period of third data is a third period. The second period is twice the first period, and the third period is three times the first period. In this case, the first data is sent in the first period. The first data and the second data are sent in the second period. The first data and the third data are sent in the third period.

For example, when the first apparatus needs to send newly added data to the second apparatus, the first apparatus may set, based on a measurement period of the newly added data and/or a change period of a data source, a report period of the newly added data to be N times an existing piece of data, where N is a natural number greater than 1.

Specifically, when a time node of the first period arrives, the first apparatus packs the first data and sends the packed first data to the second apparatus. The packed data packet includes a count value of a first counter. The count value is used to indicate a sequence number of a data packet corresponding to the first data. Further, when configuration information of the second data appears for the first time, the sending period of the second data is configured as the second period. Optionally, the second period may be set to N times the first period, where N is a natural number greater than 1 (in specific setting, the first period may also be set to N times the second period, where N is a natural number greater than 1). When a time node of the second period arrives, the first apparatus sends the data packet including the first data and the second data to the second apparatus. The count value of the first counter or a count value of a second counter may be selected to indicate a sequence number of the data packet in the data packet including the first data and the second data. In this embodiment, a period time is calculated by using a counter. In addition, any component having a timing function may be used to calculate a period.

In this embodiment, the obtained first data and the obtained second data are sent to the second apparatus by using different sending periods, to reduce the redundant information and improve the transmission resource utilization.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

Figure 3:
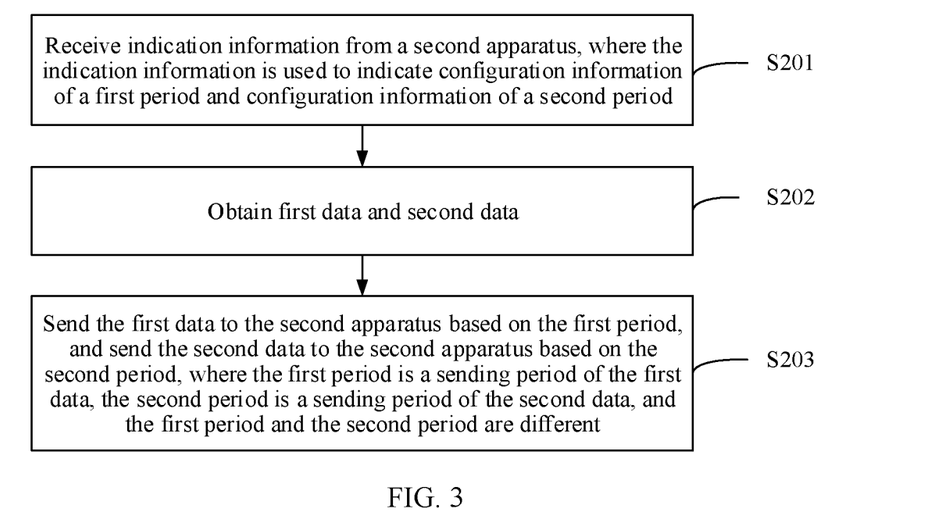
FIG. 3 is a flowchart 2 of a communication method according to an embodiment of this application.

FIG. 3 is a flowchart 2 of a communication method according to an embodiment of this application. Referring to FIG. 3, the method in this embodiment includes the following steps.

Step S201: Receive indication information from a second apparatus, where the indication information is used to indicate configuration information of a first period and configuration information of a second period.

Step S202: Obtain first data and second data.

Step S203: Send the first data to the second apparatus based on the first period, and send the second data to the second apparatus based on the second period, where the first period is a sending period of the first data, the second period is a sending period of the second data, and the first period and the second period are different.

In this embodiment, the second apparatus in the step S201 may be a fusion module receiving data reported by a first apparatus, or a control unit implementing data fusion processing.

In a first implementation, the second apparatus may first send the indication information. After receiving the indication information, a first apparatus sends the configuration information of the first period and the configuration information of the second period to the second apparatus. Then, the second apparatus acknowledges the configuration information of the first period and the configuration information of the second period. If the first apparatus receives acknowledgment information fed back by the second apparatus, configuration of the first period and the configuration of the second period are completed. In this case, the indication information is used to indicate the first apparatus to configure the first period and the second period.

In a second implementation, a first apparatus actively sends period configuration information to the second apparatus. The period configuration information includes the configuration information of the first period and/or the configuration information of the second period. Then, after receiving the period configuration information, the second apparatus feeds back acknowledgment information to the first apparatus. The acknowledgment information is used to acknowledge use of the configuration information of the first period and the configuration information of the second period. After receiving the acknowledgment information from the second apparatus, the first apparatus may send the first data and the second data to the second apparatus based on corresponding periods.

In the foregoing process, periods of different data may be configured by using interaction signaling between the first apparatus and the second apparatus. It should be noted that the period configuration information may be modified after being determined.

Specifically, road conditions of a city road, a highway, and a closed campus are different, and a ranging scope and a speed measurement range also have different requirements based on different scenarios. A measurement period of information about a moving object may be adjusted to extend a report period. For example, when an actual scenario of an automobile changes, either the first apparatus or the second apparatus may initiate changing the period configuration information.

In this embodiment, specific implementation principles and implementation processes of the step S202 and the step S203 are similar to the implementation principles and implementation processes of the method shown in FIG. 2. Details are not described herein again.

In this embodiment, period configuration information of different data may be determined by using signaling interaction between communications apparatuses. After determining the period configuration information, the first apparatus sends the obtained first data and the obtained second data in different sending periods to the second apparatus, to reduce redundant information and improve transmission resource utilization.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

Figure 4:
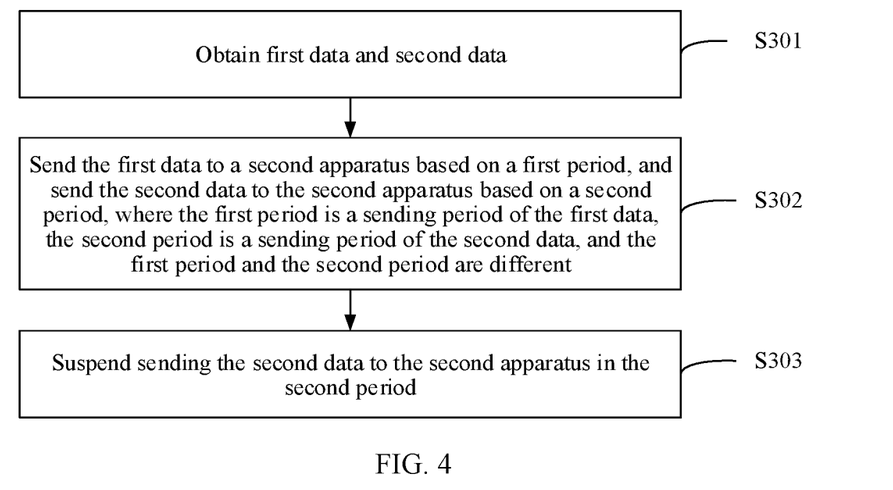
FIG. 4 is a flowchart 3 of a communication method according to an embodiment of this application.

FIG. 4 is a flowchart 3 of a communication method according to an embodiment of this application. Referring to FIG. 4, the method in this embodiment includes the following steps.

Step S301: Obtain first data and second data.

Step S302: Send the first data to a second apparatus based on a first period, and send the second data to the second apparatus based on a second period, where the first period is a sending period of the first data, the second period is a sending period of the second data, and the first period and the second period are different.

Step S303: Suspend sending the second data to the second apparatus in the second period.

In this embodiment, specific implementation principles and implementation processes of the step S301 and the step S302 are similar to the implementation principles and implementation processes of the method shown in FIG. 2. Details are not described herein again.

For example, in the step S303, a first apparatus may suspend sending the second data to the second apparatus at any sending time node in the second period.

Specifically, when an environment factor or another factor changes, sending of the second data needs to be suspended. In this case, a first apparatus packs the first data and sends the packed first data to the second apparatus. The packed data packet includes a count value of a first counter. The count value is used to indicate a sequence number of a data packet corresponding to the first data. In this embodiment, a period time is calculated by using a counter. In addition, any component having a timing function may be used to calculate a period.

Specifically, when an automobile enters a highway from a common road, because traffic light information of an intersection does not need to be measured on the highway, traffic light information originally sent together with information about a moving object is not applicable to a road condition scenario of the highway. Therefore, after the automobile enters the highway through a toll gate, the first apparatus may suspend sending the second data to the second apparatus in the second period.

Further, after performing the step S303, the first apparatus may also resume sending the second data to the second apparatus in the second period.

Specifically, when the automobile enters a common road from the highway, because traffic light information at an intersection needs to be measured on the common road, after the automobile enters the common road through a toll exit, the first apparatus may resume sending the second data to the second apparatus in the second cycle.

It should be noted that a quantity of types of data obtained by the first apparatus is not limited in this embodiment. The first apparatus may obtain more than two types of data.

Specifically, three types of data are used as an example. It is assumed that a sending period of first data is a first period, a sending period of second data is a second period, and a sending period of third data is a third period. The second period is twice the first period, and the third period is three times the first period. In this case, the first data is sent in the first period. The first data and the second data are sent in the second period. The first data and the third data are sent in the third period.

Further, when a driving scenario of the automobile changes, the first apparatus may suspend sending the second data to the second apparatus in the second period, or the first apparatus may suspend sending the third data to the second apparatus in the third period.

It should be noted that, in this embodiment, specific to-be-suspended data is not limited, and the first apparatus may suspend reporting of any data.

In this embodiment, the first apparatus may suspend sending the second data to the second apparatus in the second period as required. Therefore, when an application scenario changes and a piece of data is not required, the first apparatus may suspend reporting the corresponding data at any time, to reduce redundant data.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

Figure 5:
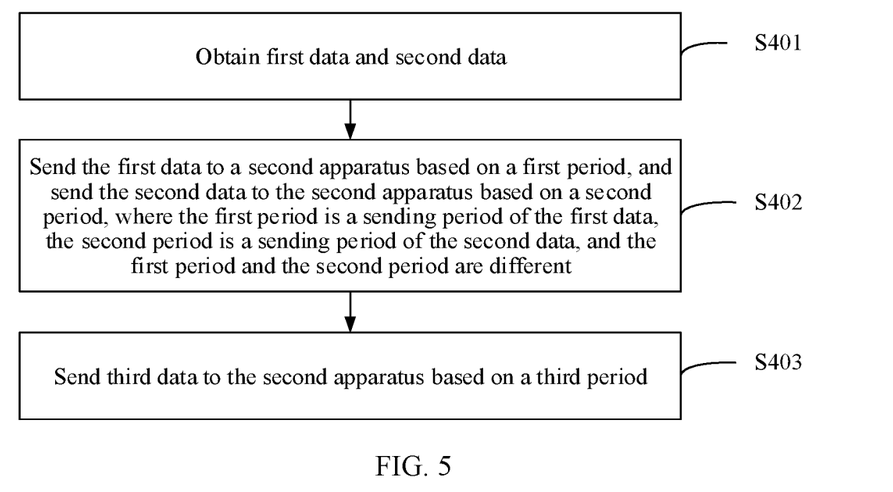
FIG. 5 is a flowchart 4 of a communication method according to an embodiment of this application.

FIG. 5 is a flowchart 4 of a communication method according to an embodiment of this application. Referring to FIG. 5, the method in this embodiment includes the following steps.

Step S401: Obtain first data and second data.

Step S402: Send the first data to a second apparatus based on a first period, and send the second data to the second apparatus based on a second period, where the first period is a sending period of the first data, the second period is a sending period of the second data, and the first period and the second period are different.

Step S403: Send third data to the second apparatus based on a third period.

In this embodiment, specific implementation principles and implementation processes of the step S401 and the step S402 are similar to the implementation principles and implementation processes of the method shown in FIG. 2. Details are not described herein again.

For example, in the step S403, a sensor side may send the third data to the second apparatus in the third period.

A configuration manner of the third period is not limited in this embodiment. When the third period needs to be newly added to send the third data, any one of the following manners may be used:

In a first implementation, the second apparatus may first send indication information. After receiving the indication information, a first apparatus sends configuration information of the third period to the second apparatus. Then, the second apparatus acknowledges the configuration information of the third period. If the first apparatus receives acknowledgment information fed back by the second apparatus, configuration of the third period is completed. In this case, the indication information is used to indicate the first apparatus to configure the third period.

In a second implementation, a first apparatus actively sends period configuration information to the second apparatus. The period configuration information includes configuration information of the third period. Then, after receiving the period configuration information, the second apparatus feeds back acknowledgment information to the first apparatus. The acknowledgment information is used to acknowledge use of the configuration information of the third period. After receiving the acknowledgment information from the second apparatus, the first apparatus may send the third data to the second apparatus based on a corresponding period.

In the foregoing process, periods of different data may be configured by using interaction signaling between the first apparatus and the second apparatus. It should be noted that the period configuration information may be modified after being determined.

It should be noted that specific configuration of the third period is not limited in this embodiment.

For example, a duration of the third period may be set to N times a duration of the first period, where N is a natural number greater than 1. Alternatively, a duration of the third period may be set to M times a duration of the second period, where M is a natural number greater than 1.

In this embodiment, the third period is configured as a multiple of the first period or the second period, to reduce redundant data and improve transmission resource utilization. Theoretically, a larger quantity of types of data that can be included in a data packet in a same period indicates higher transmission efficiency. Therefore, in an actual application, the third period is configured as a multiple of another data period based on a collection period of the newly added third data and/or a change period of a data source.

For example, a period of the third data may also be configured to be the same as a period of the first data or a period of the second data.

In this embodiment, when the collection period of the third data and/or the change period of the data source is close to a collection period of the first data and/or a change period of a data source, a report period of the third data may be set to be the same as a report period of the first data. When the collection period of the third data and/or the change period of the data source is close to a collection period of the second data and/or a change period of a data source, a report period of the third data may be set to be the same as a report period of the second data.

Specifically, when an environment factor or another factor changes, sending of the third data needs to be newly added. In this case, a sending period corresponding to the third data is first configured as the third period. It is assumed that a set third period is N times the first period, where N is a natural number greater than 1. In this case, when a time node of the third period arrives, the first apparatus packs the first data and the third data, and sends packed data to the second apparatus. The packed data packet includes a count value of a first counter or a count value of a third counter. The count value is used to indicate a sequence number of a data packet corresponding to the first data. In this embodiment, a period time is calculated by using a counter. In addition, any component having a timing function may be used to calculate a period.

In this embodiment, the third period may be newly added, and the third data is sent to the second apparatus in the third period. In this way, a report period and report data can be conveniently added, so that data report is more flexible.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

Figure 6:
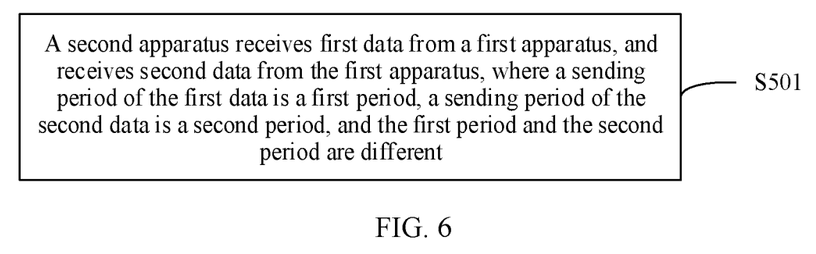
FIG. 6 is a flowchart 5 of a communication method according to an embodiment of this application.

FIG. 6 is a flowchart 5 of a communication method according to an embodiment of this application. Referring to FIG. 6, the method in this embodiment includes the following steps.

Step S501: A second apparatus receives first data from a first apparatus, and receives second data from the first apparatus, where a sending period of the first data is a first period, a sending period of the second data is a second period, and the first period and the second period are different.

In this embodiment, the second apparatus is in communication connection to the first apparatus. The second apparatus may be a fusion module, or a control unit implementing data fusion processing. Before the step S501 is performed, the first apparatus obtains the first data and the second data. Then, the first apparatus sends the first data to the second apparatus based on the first period, and sends the second data to the second apparatus based on the second period.

In this embodiment, the first data and the second data are received in different sending periods, to reduce redundant information and improve transmission resource utilization.

For example, before performing the step S501, the second apparatus may further send indication information to the first apparatus. The indication information is used to indicate configuration information of the first period and configuration information of the second period.

In a first implementation, the indication information includes the configuration information of the first period and the configuration information of the second period.

In this embodiment, the second apparatus may first send the indication information. After receiving the indication information, the first apparatus sends the configuration information of the first period and the configuration information of the second period to the second apparatus. Then, the second apparatus acknowledges the configuration information of the first period and the configuration information of the second period. If the first apparatus receives acknowledgment information fed back by the second apparatus, configuration of the first period and the configuration of the second period are completed. In this case, the indication information is used to indicate the first apparatus to configure the first period and the second period.

In a second implementation, the indication information includes acknowledgment information. The acknowledgment information is used to acknowledge use of the configuration information of the first period and the configuration information of the second period.

In this embodiment, the first apparatus may actively send period configuration information to the second apparatus. The period configuration information includes the configuration information of the first period and/or the configuration information of the second period. Then, after receiving the period configuration information, the second apparatus feeds back acknowledgment information to the first apparatus. The acknowledgment information is used to acknowledge use of the configuration information of the first period and the configuration information of the second period. After receiving the acknowledgment information from the second apparatus, the first apparatus may send the first data and the second data to the second apparatus based on corresponding periods.

In the foregoing process, periods of different data may be configured by using interaction signaling between the first apparatus and the second apparatus. It should be noted that the period configuration information may be modified after being determined.

In this embodiment, period configuration information of different data may be determined by using signaling interaction between communications apparatuses. After determining the period configuration information, a sensor side sends the obtained first data and the obtained second data in different sending periods to the second apparatus, to reduce the redundant information and improve the transmission resource utilization.

Figure 7:
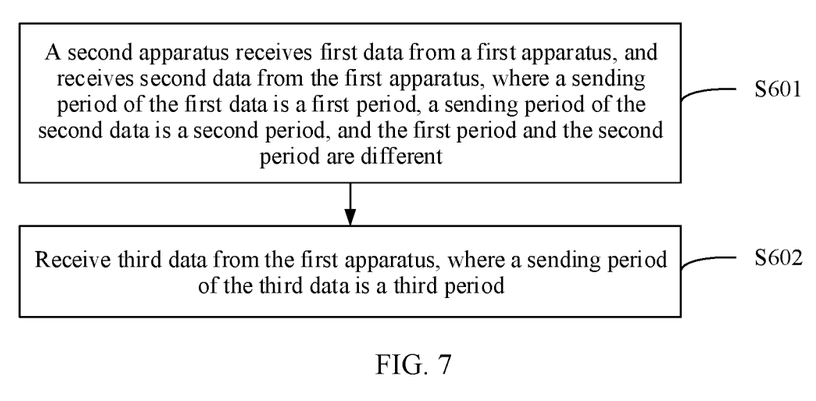
FIG. 7 is a flowchart 6 of a communication method according to an embodiment of this application.

FIG. 7 is a flowchart 6 of a communication method according to an embodiment of this application. Referring to FIG. 7, the method in this embodiment includes the following steps.

Step S601: A second apparatus receives first data from a first apparatus, and receives second data from the first apparatus, where a sending period of the first data is a first period, a sending period of the second data is a second period, and the first period and the second period are different.

Step S602: Receive third data from the first apparatus, where a sending period of the third data is a third period.

In this embodiment, the first apparatus may send the third data to the second apparatus in the third period, so that the second apparatus receives the third data sent based on the third period.

A configuration manner of the third period is not limited in this embodiment. When the third period needs to be newly added to send the third data, any one of the following manners may be used:

In a first implementation, the second apparatus may first send indication information. After receiving the indication information, the first apparatus sends configuration information of the third period to the second apparatus. Then, the second apparatus acknowledges configuration information of the third period. If the first apparatus receives acknowledgment information fed back by the second apparatus, configuration of the third period is completed. In this case, the indication information is used to indicate the first apparatus to configure the third period.

In a second implementation, the first apparatus actively sends period configuration information to the second apparatus. The period configuration information includes configuration information of the third period. Then, after receiving the period configuration information, the second apparatus feeds back acknowledgment information to the first apparatus. The acknowledgment information is used to acknowledge use of the configuration information of the third period. After receiving the acknowledgment information from the second apparatus, the first apparatus may send the third data to the second apparatus based on a corresponding period.

In the foregoing process, periods of different data may be configured by using interaction signaling between the first apparatus and the second apparatus. It should be noted that the period configuration information may be modified after being determined.

It should be noted that specific configuration of the third period is not limited in this embodiment.

For example, a duration of the third period may be set to N times a duration of the first period, where N is a natural number greater than 1. Alternatively, a duration of the third period may be set to M times a duration of the second period, where M is a natural number greater than 1.

In this embodiment, the third period is configured as a multiple of the first period or the second period, to reduce redundant data and improve transmission resource utilization. Theoretically, a larger quantity of types of data that can be included in a data packet in a same period indicates higher transmission efficiency. Therefore, in an actual application, the third period is configured as a multiple of another data period based on a collection period of the newly added third data and/or a change period of a data source.

For example, a period of the third data may also be configured to be the same as a period of the first data or a period of the second data.

In this embodiment, when the collection period of the third data and/or the change period of the data source is close to a collection period of the first data and/or a change period of a data source, a report period of the third data may be set to be the same as a report period of the first data. When the collection period of the third data and/or the change period of the data source is close to a collection period of the second data and/or a change period of a data source, a report period of the third data may be set to be the same as a report period of the second data.

In this embodiment, the third period may be newly added, and the third data is sent to the second apparatus in the third period. In this way, a report period and report data can be conveniently added, so that data report is more flexible.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

Figure 8:
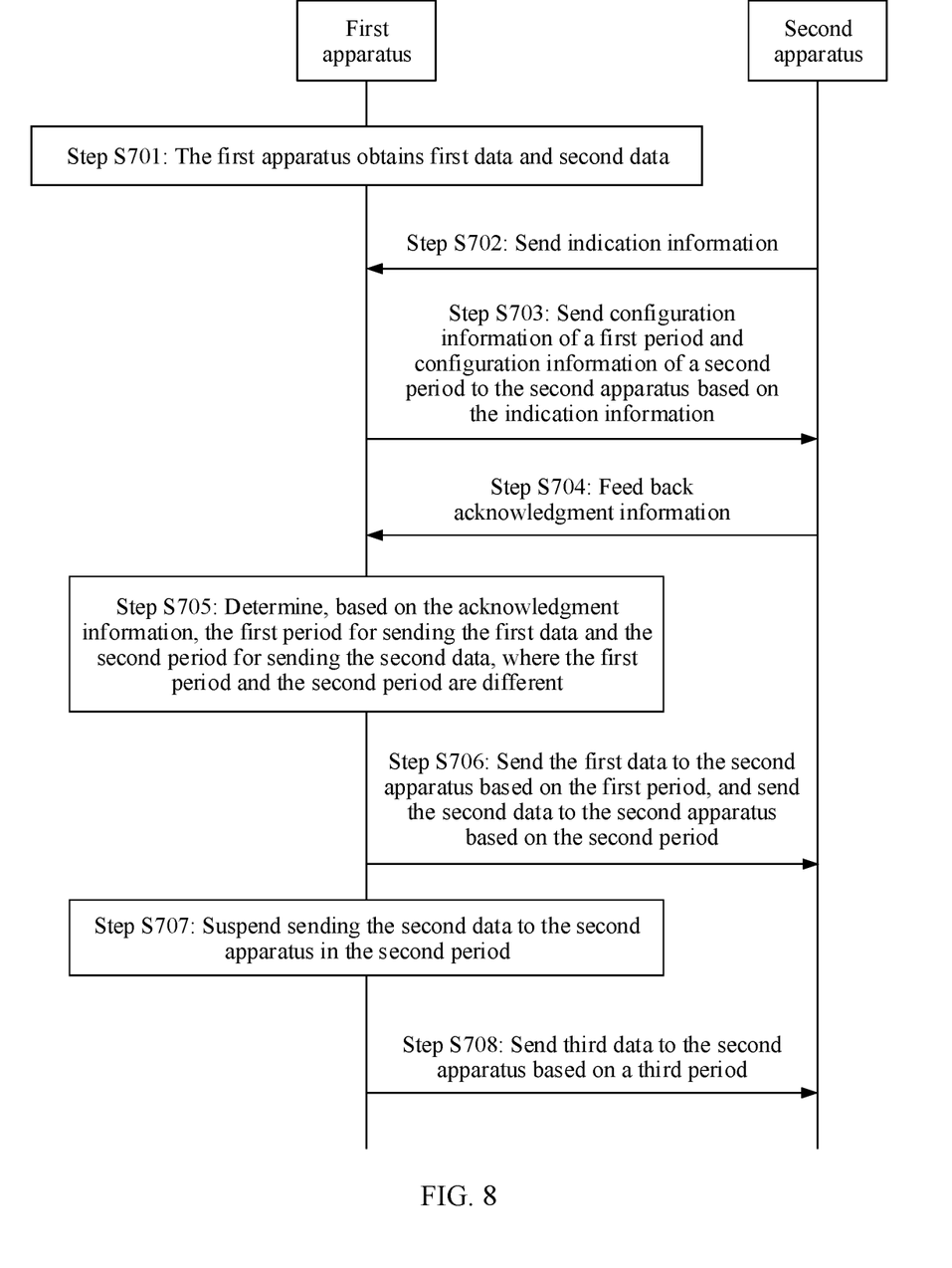
FIG. 8 is a signaling interaction diagram 1 of a communication method according to an embodiment of this application.

FIG. 8 is a signaling interaction diagram 1 of a communication method according to an embodiment of this application. Referring to FIG. 8, the method in this embodiment includes the following steps.

Step S701: A first apparatus obtains first data and second data.

Step S702: A second apparatus sends indication information to the first apparatus.

Step S703: The first apparatus sends configuration information of a first period and configuration information of a second period to the second apparatus based on the indication information.

Step S704: The second apparatus receives the configuration information of the first period and the configuration information of the second period, and feeds back acknowledgment information to the first apparatus.

Step S705: The first apparatus determines, based on the acknowledgment information, the first period for sending the first data and the second period for sending the second data, where the first period and the second period are different.

Step S706: Send the first data to the second apparatus based on the first period, and send the second data to the second apparatus based on the second period.

Step S707: The first apparatus suspends sending the second data to the second apparatus in the second period.

Step S708: The first apparatus sends third data to the second apparatus based on a third period.

In this embodiment, period configuration information of different data may be determined by using signaling interaction between the first apparatus and the second apparatus. After determining the period configuration information, the first apparatus sends the obtained first data and the obtained second data in different sending periods to the second apparatus, to reduce redundant information and improve transmission resource utilization.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

Figure 9:
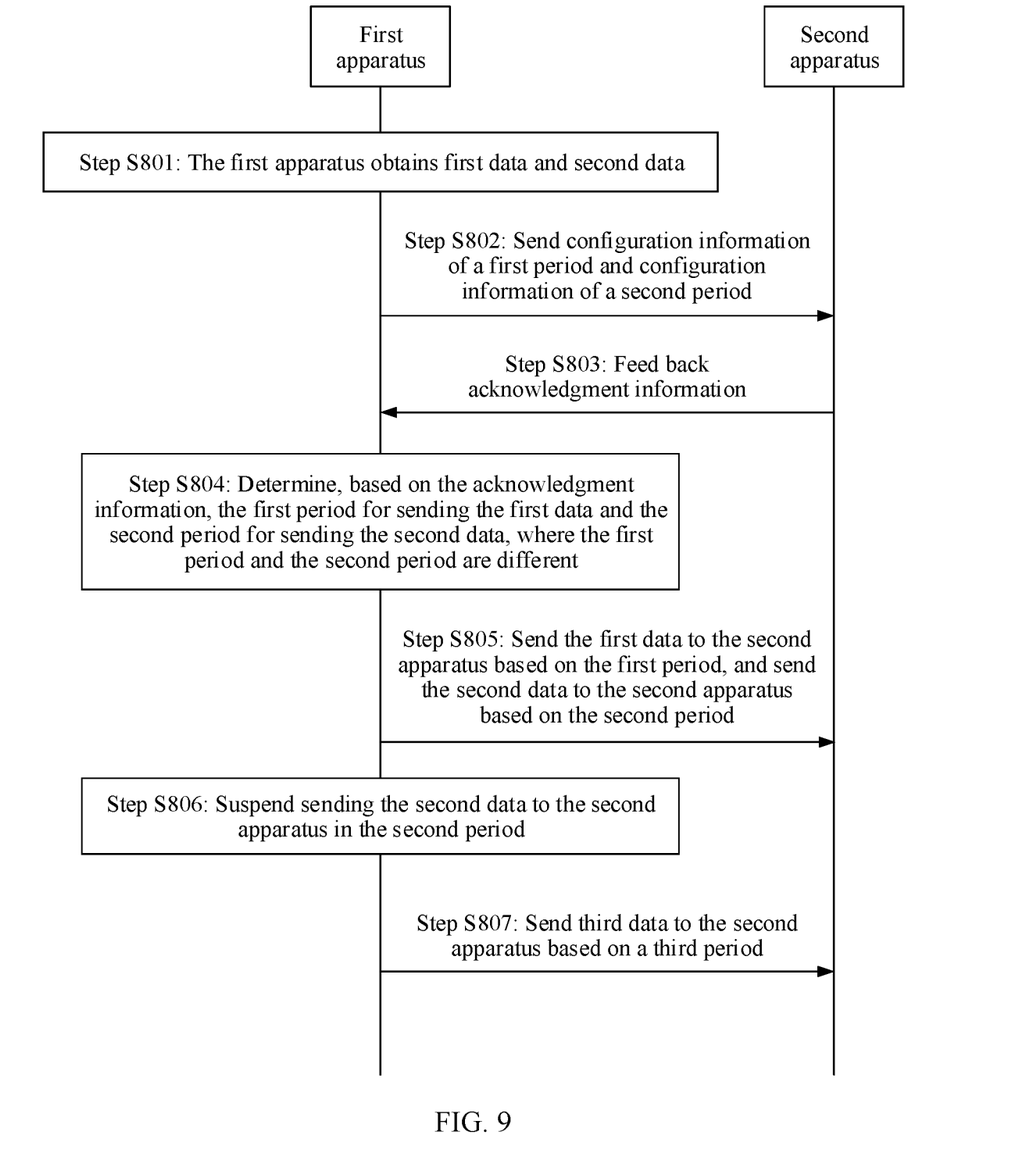
FIG. 9 is a signaling interaction diagram 2 of a communication method according to an embodiment of this application.

FIG. 9 is a signaling interaction diagram 2 of a communication method according to an embodiment of this application. Referring to FIG. 9, the method in this embodiment includes the following steps.

Step S801: A first apparatus obtains first data and second data.

Step S802: The first apparatus sends configuration information of a first period and configuration information of a second period to a second apparatus.

Step S803: The second apparatus receives the configuration information of the first period and the configuration information of the second period, and feeds back acknowledgment information to the first apparatus.

Step S804: The first apparatus determines, based on the acknowledgment information, the first period for sending the first data and the second period for sending the second data, where the first period and the second period are different.

Step S805: Send the first data to the second apparatus based on the first period, and send the second data to the second apparatus based on the second period.

Step S806: The first apparatus suspends sending the second data to the second apparatus in the second period.

Step S807: The first apparatus sends third data to the second apparatus based on a third period.

In this embodiment, period configuration information of different data may be determined by using signaling interaction between the first apparatus and the second apparatus. After determining the period configuration information, the first apparatus sends the obtained first data and the obtained second data in different sending periods to the second apparatus, to reduce redundant information and improve transmission resource utilization.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

Figure 10:
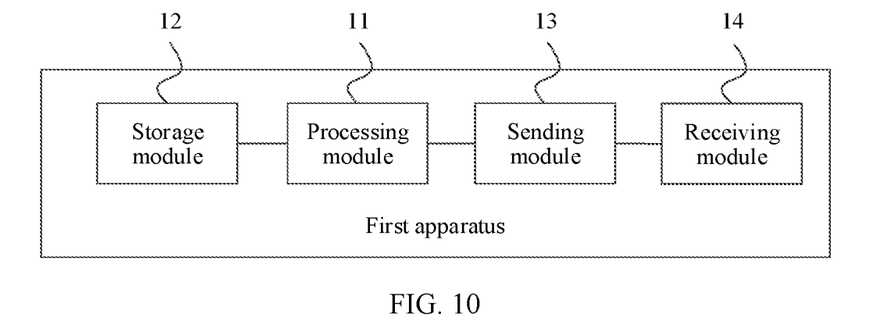
FIG. 10 is a schematic diagram of a structure of a first apparatus for communication according to an embodiment of this application.

FIG. 10 is a schematic diagram of a structure of a first apparatus for communication according to an embodiment of this application. The first apparatus may be configured to perform the methods in the embodiments shown in FIG. 2 to FIG. 5. As shown in FIG. 10, the first apparatus includes a processing module 11, a storage module 12, and a sending module 13. The storage module 12 is configured to be coupled to the processing module 11, and store a program instruction and/or data.

The processing module 11 is configured to obtain first data and second data.

The sending module 13 is configured to send the first data to a second apparatus based on a first period, and send the second data to the second apparatus based on a second period.

The first period is a sending period of the first data. The second period is a sending period of the second data. The first period and the second period are different.

For example, the processing module 11 may be a processor, and the sending module 13 may be a transmitter.

For example, the first apparatus may be a sensor, for example, radar, lidar, ultrasonic radar, or a camera. Specifically, the radar, the lidar, and the ultrasonic radar each measure a surrounding object from different dimensions. Conditions and attributes, of a target, sensed by each sensor are different. For example, the radar is good at identifying a target moving distance, a speed, and can be used in relatively wide weather conditions. However, the camera may identify surrounding environment information by collecting an image, and is greatly affected by a light condition.

It should be noted that a specific type of the first apparatus is not limited in this embodiment. The first apparatus may be a single sensor, may be a plurality of sensors of different types, or may be a combination device of a plurality of sensors of a same type.

For example, the first apparatus may be a first camera installed on a front end of an automobile. The first camera is configured to collect a moving object, a road traffic sign, traffic light information, and the like on a road.

For example, the first apparatus may be a combination device including a plurality of cameras. For example, the first apparatus may be a combination device including a first camera installed on a front end of an automobile, a second camera installed on a left side of the automobile, a third camera installed on a right side of the automobile, and a fourth camera installed on a rear end of the automobile. In this embodiment, the first camera, the second camera, the third camera, and the fourth camera are configured to photograph an environmental image of 360 degrees around the automobile.

For example, the first apparatus may be a combination device including radar, lidar, and ultrasonic radar. The radar, the lidar, and the ultrasonic radar may all be configured to measure a distance between a surrounding object and the first apparatus.

For example, the second apparatus may be a fusion module receiving data reported by the first apparatus, or a control unit implementing data fusion processing. The second apparatus may be an independent device, or may be integrated into an in-vehicle control system or a central processing unit. For example, the second apparatus is a vehicle-mounted computer.

In an optional implementation, the first apparatus may send collected data to a fusion module or a data fusion module of a central processing unit through a standard data transmission interface.

In another optional implementation, the first apparatus may further send collected data to a fusion module or a data fusion module of a central processing unit in a wireless manner. The wireless manner includes reporting data through a Wi-Fi local area network or Bluetooth.

In a possible design, the first period is preconfigured, or is determined based on a collection period of the first data; and/or
  the second period is preconfigured, or is determined based on a collection period of the second data.

In a possible design, the apparatus further includes:
  a receiving module 14, configured to receive indication information from the second apparatus, where the indication information is used to indicate configuration information of the first period and configuration information of the second period.

For example, the receiving module 14 may be a receiver.

In a possible design, the indication information includes the configuration information of the first period and the configuration information of the second period; or
  the indication information includes acknowledgment information, and the acknowledgment information is used to acknowledge use of the configuration information of the first period and the configuration information of the second period.

In a possible design, the sending module 13 is further configured to send period configuration information to the second apparatus. The period configuration information includes the configuration information of the first period and/or the configuration information of the second period.

In a possible design, a duration of the second period is N times a duration of the first period, and N is a natural number greater than 1.

In a possible design, the processing module 11 is further configured to suspend sending the second data to the second apparatus in the second period.

In a possible design, the sending module 13 is further configured to send third data to the second apparatus based on a third period.

In a possible design, a duration of the third period is N times the duration of the first period, and N is a natural number greater than 1.

In this embodiment, the obtained first data and the obtained second data are sent to the second apparatus by using different sending periods, to reduce redundant information and improve transmission resource utilization. For a specific implementation process and an implementation principle, refer to related descriptions in the embodiments shown in FIG. 2 to FIG. 5. Details are not described herein again.

Figure 11:
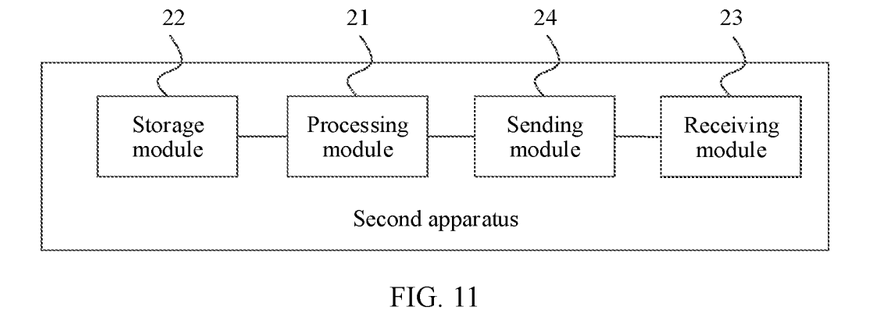
FIG. 11 is a schematic diagram of a structure of a second apparatus for communication according to an embodiment of this application.

FIG. 11 is a schematic diagram of a structure of a second apparatus for communication according to an embodiment of this application. The second apparatus may be configured to perform the methods in the embodiments shown in FIG. 6 and FIG. 7. As shown in FIG. 11, the second apparatus includes a processing module 21, a storage module 22, and a receiving module 23. The storage module 22 is configured to be coupled to the processing module 21, and store a necessary program instruction and/or data.

The receiving module 23 is configured to receive first data from a first apparatus, and receive second data from the first apparatus.

A sending period of the first data is a first period. A sending period of the second data is a second period. The first period and the second period are different.

In a possible design, the apparatus further includes:
a sending module 24, configured to send indication information to the first apparatus, where the indication information is used to indicate configuration information of the first period and configuration information of the second period.

In a possible design, the indication information includes the configuration information of the first period and the configuration information of the second period; or
the indication information includes acknowledgment information, and the acknowledgment information is used to acknowledge use of the configuration information of the first period and the configuration information of the second period.

In a possible design, the receiving module 23 is further configured to receive period configuration information sent by the first apparatus. The period configuration information includes the configuration information of the first period and/or the configuration information of the second period.

In a possible design, a duration of the second period is N times a duration of the first period, and N is a natural number greater than 1.

In a possible design, the receiving module 23 is further configured to:
receive third data that is sent by the first apparatus based on a third period.

In a possible design, a duration of the third period is N times the duration of the first period, and N is a natural number greater than 1.

In this embodiment, the first data and the second data that are sent in different sending periods are received, to reduce redundant information and improve transmission resource utilization. For a specific implementation process and an implementation principle, refer to related descriptions in the embodiments shown in FIG. 6 to FIG. 7. Details are not described herein again.

An embodiment of this application provides a computer-readable storage medium. The computer-readable storage medium stores an instruction. When the instruction is executed, a computer is enabled to perform the method performed by the terminal device in the foregoing embodiment of this application.

An embodiment of this application provides a computer-readable storage medium. The computer-readable storage medium stores an instruction. When the instruction is executed, a computer is enabled to perform the method performed by the network device in the foregoing embodiment of this application.

In the several embodiments provided in this application, it should be understood that the disclosed apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

It should be noted that, in this embodiment of this application, division into the modules is an example, and is merely a logical function division. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

If the integrated module is implemented in the form of a software functional module and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (Solid State Disk, SSD)), or the like.

What is claimed is:

1. A communication method, implemented by a first apparatus, on a sensor side, comprising a hardware processor, the method comprising:
   receiving indication information from a second apparatus,
      wherein the indication information comprises information for configuring first and second sending periods for sending data of different types to the second apparatus or information acknowledging receipt of the configuration information sent to the second apparatus from the first apparatus, and
      wherein the information for configuring first and second sending periods includes frequencies of the first and second sending periods;
   obtaining first data and second data of different types, wherein the types of data are based on different frequencies of collection periods by sources of the first and second data;
   sending the first data to the second apparatus during the first sending period whose period is according to the information for configuring the first sending period; and
   sending the second data to the second apparatus during the second sending period whose period is according to the information for configuring the second sending period,
      wherein the frequency of the first sending period is determined based on a first collection period of the first data,
      wherein the frequency of the second sending period is determined based on a second collection period of the second data,
      wherein the frequency of each of the first and second collection periods is based on a period of time for collecting the first or second data by a sensor or a period of time for changing the data, and
      wherein frequencies of the first sending period and the second sending period are different.

2. The method according to claim 1, wherein a frequency of the second sending period is N times a frequency of the first sending period, and N is a natural number greater than 1.

3. The method according to claim 1, further comprising suspending sending the second data to the second apparatus in the second period based on a driving scenario.

4. The method according to claim 1, further comprising sending third data to the second apparatus based on a third sending period.

5. The method according to claim 4, wherein a frequency of the third sending period is N times the frequency of the first sending period, and N is a natural number greater than 1.

6. A communication method, applied to a second apparatus for vehicle-control comprising a hardware processor, the method comprising:
   sending indication information to a first apparatus,
      wherein the indication information comprises information for configuring first and second sending periods for receiving data of different types from the first apparatus or receiving information acknowledging receipt of the configuration information sent from the first apparatus, and
      wherein the information for configuring first and second sending periods includes frequencies of the first and second sending periods;
   receiving first data from the first apparatus during the first sending period whose period is according to the information for configuring the first sending period; and
   receiving second data from the first apparatus during the second sending period whose period is according to the information for configuring the second sending period,
      wherein the types of the first and second data are based on different frequencies of collection periods by sources of the first and second data,
      wherein the frequency of the first sending period is determined based on a first collection period of the first data,
      wherein the frequency of the second sending period is determined based on a second collection period of the second data,
      wherein the frequency of each of the first and second collection periods is based on a period of time for collecting the first or second data by a sensor or a period of time for changing the data, and
      wherein frequencies of the first sending period and the second sending period are different.

7. The method according to claim 6, wherein a frequency of the second sending period is N times a frequency of the first sending period, and N is a natural number greater than 1.

8. The method according to claim 6, further comprising receiving third data from the first apparatus, wherein a sending period of the third data is a third sending period.

9. The method according to claim 8, wherein a frequency of the third sending period is N times the frequency of the first sending period, and N is a natural number greater than 1.

10. A first apparatus comprising:
   one or more processors, and
   a non-transitory storage medium in communication with the one or more processors, wherein the non-transitory storage medium is configured to store program instructions that, when executed by the one or more processors, cause the apparatus to perform:
      receiving indication information from a second apparatus,
         wherein the indication information comprises information for configuring first and second sending periods for sending data of different types to the second apparatus or information acknowledging receipt of the configuration information sent to the second apparatus from the first apparatus, and
         wherein the information for configuring first and second sending periods includes frequencies of the first and second sending periods;

obtaining first data and second data of different types, wherein the types of data are based on different frequencies of collection periods by sources of the first and second data;

sending the first data to the second apparatus during the first sending period whose period is according to the information for configuring the first sending period; and sending the second data to the second apparatus during the second sending period whose period is according to the information for configuring the second sending period, wherein the frequency of the first sending period is determined based on a first collection period of the first data, wherein the frequency of the second sending period is determined based on a second collection period of the second data, wherein the frequency of each of the first and second collection periods is based on a period of time for collecting the first or second data by a sensor or a period of time for changing the data, and wherein frequencies of the first sending period and the second sending period are different.

* * * * *